Nov. 20, 1951     A. T. NABSTEDT ET AL     2,575,765
FLUID PRESSURE RELEASED CLUTCH
Filed April 30, 1947     3 Sheets-Sheet 1
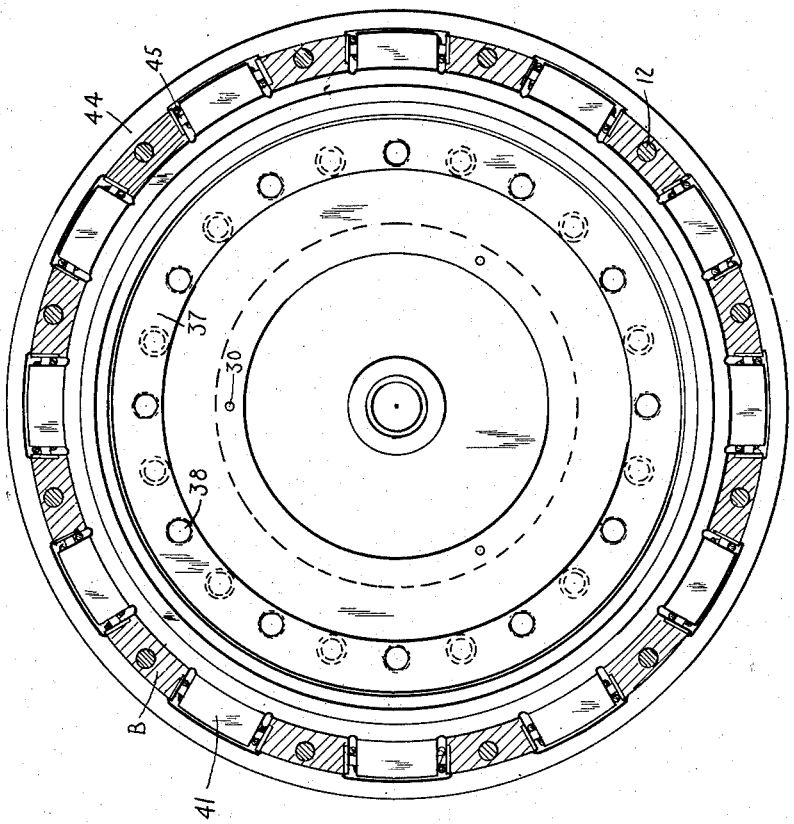
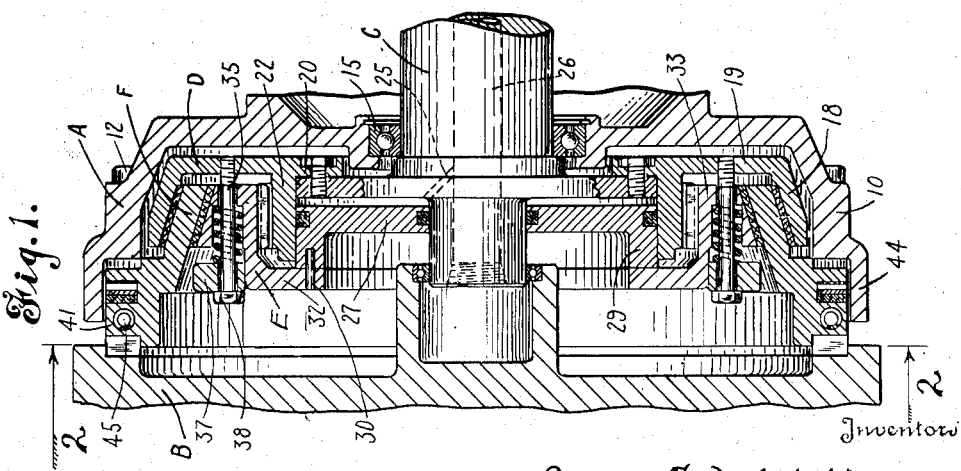
Inventors
Arthur T. Nabstedt
John O. Berndtson
By Rockwell & Bartholow
Attorneys Nov. 20, 1951 A. T. NABSTEDT ET AL 2,575,765
FLUID PRESSURE RELEASED CLUTCH
Filed April 30, 1947 3 Sheets-Sheet 2
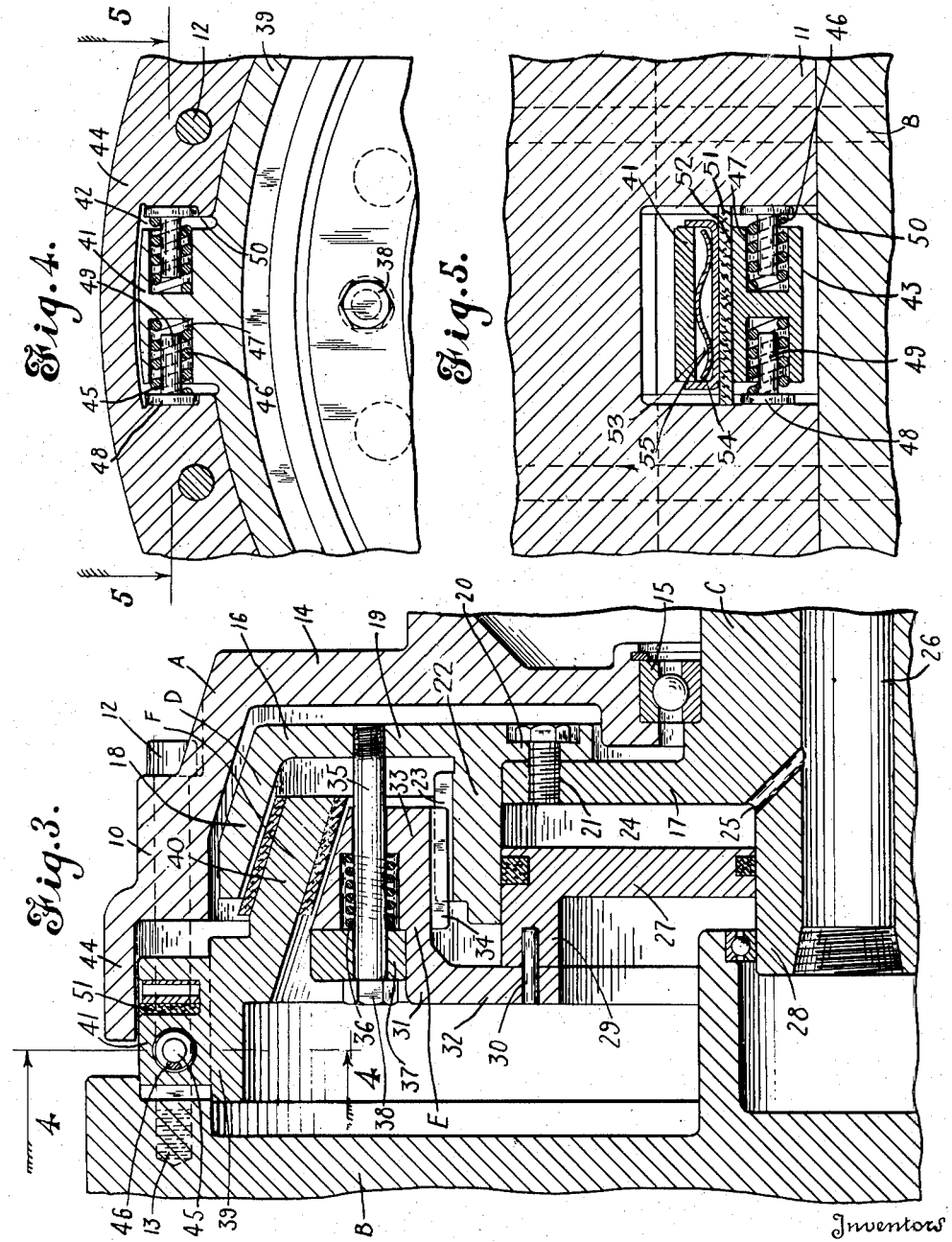
Inventors
Arthur T. Nabstedt
John O. Berudtson
By Rockwell & Bartholow
Attorneys

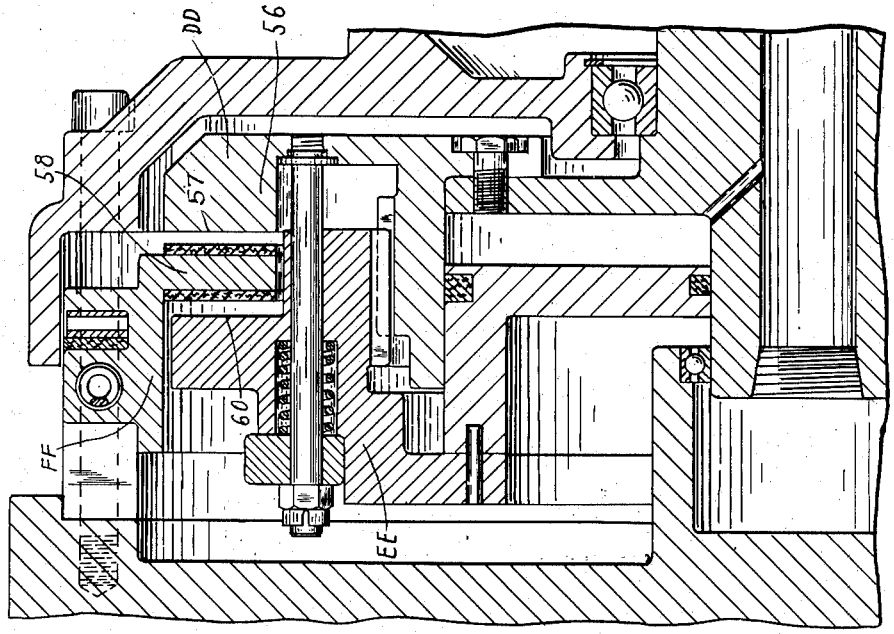
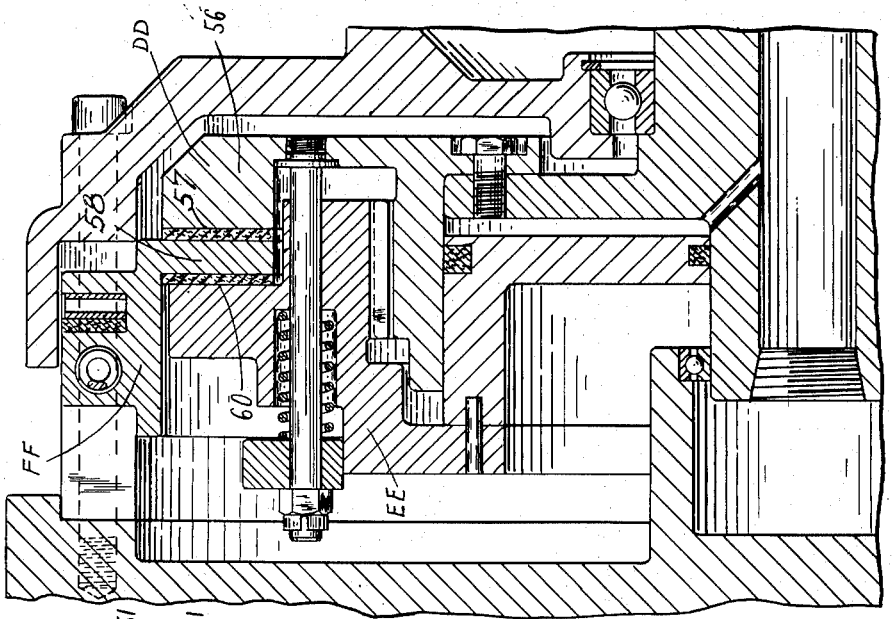
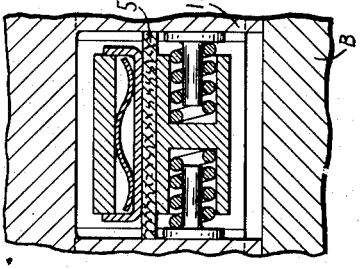

Patented Nov. 20, 1951

2,575,765

UNITED STATES PATENT OFFICE 2,575,765

FLUID PRESSURE RELEASED CLUTCH

Arthur T. Nabstedt, Hamden, and John O. Berndtson, Short Beach, Conn., assignors to The Snow-Nabstedt Gear Corporation, New Haven, Conn., a corporation of Connecticut Application April 30, 1947, Serial No. 744,817

6 Claims. (Cl. 192—91)

This invention relates to clutch mechanism, and more particularly to a clutch that can be used very advantageously in connection with marine reverse gears, although not limited to that application.

One of the objects is to provide a friction clutch involving a minimum number of parts and of relatively light structure, which is nevertheless very rugged and capable of transmitting a large amount of power.

Another object is to provide an improved and simplified friction clutch that is operable by fluid pressure, for example, the pressure of air or a liquid such as oil.

Another object is to provide an improved clutch in which vibrations occurring in the driving element, such as the engine flywheel, are absorbed so as not to be transmitted to the driven shaft.

In the accompanying drawings:

Fig. 1 is a longitudinal central section of a clutch embodying the invention, the same being shown in the engaged position;

Fig. 2 is a section on line 2—2 of Fig. 1;

Fig. 3 is a section showing on a larger scale certain parts illustrated in Fig. 1, the clutch being in the disengaged position;

Fig. 4 is a section on line 4—4 of Fig. 3;

Fig. 5 is a section on line 5—5 of Fig. 4;

Fig. 5A is a view similar to Fig. 5, showing the position of the parts when the clutch is engaged;

Fig. 6 is a sectional view showing a modified form, the clutch being in the engaged position; and Fig. 7 is a view similar to Fig. 6, showing the clutch in the disengaged position.

In Fig. 1 of the drawings, there is shown a form of clutch mechanism embodying the invention, which form is particularly useful in marine reversing gears, and a portion of such a reversing gear is disclosed, in which there is a member that is intended to be driven from the marine engine, a shaft having a forward end and whose rear end (not shown) is capable of driving a propeller or other take-off, and a fluid-pressure-actuated friction clutch adapted to interconnect the engine-driven member with the forward end portion of the shaft. The engine in this case is provided with a flywheel. The flywheel drives a member generally in the form of a cup having a peripheral portion within which are enclosed friction members having conical friction surfaces, one of these members being rigid with the shaft to be driven, a second member being axially movable with respect to the shaft, and a third member being interposed between the other two and being capable of a certain amount of axial movement. The second-mentioned member is in this case spring pressed in a manner such that the clutch is normally held in the engaged position, and the clutch is adapted to be disengaged by pressure of a suitable fluid adapted to move the second-mentioned member axially in a forward direction. The third-mentioned clutch member is mounted upon the generally cup-shaped outer member of the clutch and can have a limited axial movement with reference thereto, the third clutch member having lugs entering recesses in the cup-shaped member or casing member, and between the lugs and the cup-shaped member are interposed devices which absorb vibrations and prevent their being transmitted to the driven shaft. The fluid pressure in this case acts upon a piston member which is fixed to the spring-pressed clutch member, the pressure fluid reaching the pressure chamber through a longitudinal passage in the driven shaft.

In the drawings, the engine-driven member previously referred to is indicated generally at A, the same being driven by the engine flywheel B, and the rotary shaft is indicated at C. The axially fixed clutch member is indicated at D, the spring-pressed axially movable member at E, and the third clutch member interposed between the other two at F. This member F is mounted upon and axially movable with respect to the cup-shaped engine-driven member A, as hereinafter described.

In the form shown, the member A is a cup-shaped member having a peripheral wall 10, the forward edge portion 11 of which is abutted against the flywheel B. The member A is fastened to the flywheel in any suitable manner, as by the bolts 12, which have accessible rear ends, and which have threaded forward ends 13 that engage threaded sockets in the flywheel. The member A has a rear transverse wall 14 which is rotatably supported on the shaft C by an antifriction bearing 15. In a reverse gear the wall 14 may have suitable connections (not shown) with a gear set.

Within the member A and forwardly of wall 14 is the clutch member D which is shown as comprising a ring-shaped part 16 fixed upon a flange 17 provided upon shaft C. The part 16 has at its periphery a part 18 presenting a conical wall, the inner surface of which is adapted to act as a clutch surface, as hereinafter described. This wall 18 is integral with a web portion 19 of part 16, which web portion has a radially inner edge portion 20 that overlaps flange 17 at the rear of said flange and is fastened thereto by a number of screws 21. Resting upon the periphery of the flange 17 is a ring-shaped part 22 integral with and projecting forwardly from the web 19.

The ring-shaped part 22 is provided at its radially outer part with splines 23, which co-act with splines provided upon clutch member E, as hereinafter described. The ring-shaped part 22 in association with the flange 17 provides a fluid-pressure chamber in the shape of a cylinder, indicated at 24, receiving pressure fluid from a lateral passage 25 that is in communication with a longitudinal fluid passage 26 provided in the shaft C. Moving axially in the fluid chamber is a piston 27 in the form of a ring or annulus. This ring or annulus is guided at its inner portion upon a cylindrical extension 28 of the shaft, and at its radially outer portion upon the radially inner surface of the ring-shaped part 22. At its inner and outer parts the piston is provided with suitable packing material, as shown. At its radially outer part the piston is provided with a forwardly extending wall 29 rigidly connected with the body part of the clutch member E in a suitable manner, as by the pins 30.

In the form shown, the member E comprises a part 31 of ring shape, having a web 32 with which the pins 30 are engaged, and having integral therewith a rearward extension 33. The extension 33 is splined to the part 22 by splines 34 engaging the splines 23. The splines 34 are provided upon the radially inner part of the member or portion 33, and at its radially outer part the part 33 is provided with a cone surface adapted to engage a similar surface on clutch member F.

The member E is guided axially with reference to the clutch member D by guide pins 35, said pins having threaded rear ends engaging threaded sockets provided in the web portion of the member D. These guide pins extend forwardly through round openings provided in the part 33, and through sockets in part 33 which are in communication with said openings, said sockets accommodating helical springs 36 that surround the pins 35 and press against the bottoms of the sockets in a manner to engage clutch member E with member F. At their forward ends the guide pins 35 extend through openings in a ring 37, said ring resting on a shoulder of clutch member E and overlying the front face of part or extension 33 in which the spring sockets are provided. The forward ends of the guide pins 35 are provided with nuts 38 which hold the ring 37 in place, and the ring 37, by abutting the forward face of part 33, limits the forward or disengaging movement of clutch member E. The springs 36, being under compression in their sockets, act to hold the clutch normally in the engaged position, member E being held against member F, and member F, in turn, against member D.

Clutch member F is a ring-shaped member mounted in and axially movable of member A, and having a cylindrical part 39 at the forward portion by means of which the same is mounted. Extending rearwardly from the portion 39 and integral therewith is a conical portion 40 directed inwardly and rearwardly and provided with inner and outer parallel friction surfaces, the inner surface engaging member E and the outer surface engaging member D. In the form shown, the friction surfaces of the part 40 are provided by layers of friction material applied to conical surfaces of the part 40.

The cylindrical portion 39 has an external diameter substantially the same as the internal diameter of the member A, and upon this portion of clutch member F are provided a plurality of integral lugs 41 that project radially outwardly and are received in recesses 42 that are provided in the member A. The forward edges 43 of these lugs 41 in the disengaged position of the clutch are set back somewhat from the forward edge portion 11 of member A, as shown in Figs. 3 and 5. The recesses are formed in part by a peripheral portion 44 integral with member A projecting toward but not to member B, as shown in Fig. 3. The fastening bolts 12 previously mentioned pass through solid portions alternating with the peripheral recesses provided in member A. The lugs 41 are free to move forwardly and rearwardly in the recesses 42, so that the intermediate clutch member F may assume the engaged position shown in Fig. 1 and the disengaged position shown in Fig. 3. Rotation of member F is obtained from rotation of member A through resilient devices associated with the lugs 41 and the adjacent portions of member A, the arrangement being such that vibrations occurring in the flywheel and in the member A will be absorbed in the clutch and will not be transmitted to the driven shaft. The arrangement includes spring devices 45 associated with the sides of the lugs 41, and there is also provided in this form a device for damping the movements of the resiliently supported lugs.

In the form shown, each spring device 45 includes a helical spring 46 arranged in a lateral cylindrical socket 47 provided in the corresponding side face of the lug. One end of the spring 46 acts against the bottom of the socket, and the other end acts against a head 48 provided upon a stem 49 which enters the coil of the spring. The head 48 is pressed by the spring against the side surface 50 of the recess 42, and as the two spring devices employed are symmetrically arranged with reference to the lug, the tendency of the springs is to hold the lug centrally of the recess, there being equal clearances at opposite sides of the lug. When torque is transmitted in one direction to the member E from the member A, the headed pin at one side of the lug is pressed against its spring, and the spring against the lug, thus taking up shock and causing the member E to rotate without being subject to the vibrations or irregular motion of part A. It is understood, of course, that, while in rotating the clutch member the pin at one side of the recess is being used as a driving pin in the manner explained, the pin at the other side of the recess acts to receive the thrust which is imposed by the action of the bottom part of the spring socket upon the spring. In order to dampen the movement of the spring-supported lugs, it may be necessary or preferable to use damping devices which resist the lateral or angular movements of the lugs in the recess, and in the form shown such damping devices are used, the same comprising in the case of each lug a strip of friction material, such as indicated at 51, bearing against a transverse face 52 provided upon lug 41. In the present case the result is achieved by providing the lug with a transverse cut-away portion 53 in which is received the strip 51, and a plate 54 backed by a leaf spring 55. The action of the spring 55 is such as to press the friction strip against the friction surface of the lug. The ends of the friction strip are engaged with the sides of the recess 42 so as to prevent displacement of the strip, and thus, the strip being firmly pressed against a friction surface on the lug, vibratory movement of the lug in the recess is effectively damped.

The clutch member F, coupled to the engine through the clutch casing, rotates continuously. When it is moved axially in engaging the clutch, the lug 41 and its associated devices move from the position of Fig. 5 to the position of Fig. 5A, and then when the clutch is released again they move back to the initial position. In doing this, the heads of the pins and the ends of the friction strip slide upon the side surfaces of the recess 42.

It is believed that the operation of the clutch will be apparent from the foregoing description. The springs 36 press the member E against the member F, and the member F against the member D, member F being engaged at opposite conical surfaces, member D being rigid with the driven shaft, and member E being prevented from relative rotation by the splined connection between its clutching extension and the splined forwardly projecting ring or ledge 22 upon member D. As soon as fluid is introduced into the chamber 24, piston 27 is moved to the left with reference to Fig. 1, thereby shifting member E to the released position, this movement being limited by the clutching part 33 abutting against the ring 37, movement of which to the left (Fig. 3) is limited by the nuts 38. As long as the pressure is maintained in the pressure chamber, the clutch is held in the disengaged position. When member E is moved to the left with reference to Fig. 1, the member F is disengaged and moves in an axial direction out of its engagement with the member D by being thrown off from member D as soon as it is freed. As soon as the pressure in the pressure cylinder is released, the springs 36, acting on the rim portion of member E, restore it to the initial position, and the member F is again clamped between D and E, rotation being imparted to the shaft through the member D. The member F rotates idly when the clutch is disengaged, and, by the use of the resilient devices previously described, vibrations are not transmitted to its clutching portion having the inner and outer cone surfaces. When the clutch is engaged, therefore, vibrations or shocks are not transmitted to the members D or E.

In the modified form shown in Figs. 6 and 7, the general arrangement of the parts is substantially as above described, the principal difference being that here the clutching surfaces are planar rather than conical. Members DD, FF and EE correspond to members D, F and E of the first form. Member DD has a radially outer portion 56 provided with a planar clutching face 57 in a plane transverse to the shaft. Member FF has a plate portion 59 in a plane transverse to the shaft, and member EE has a radially outer portion having a planar clutching face 60 in a plane transverse to the shaft. Fig. 6 shows the clutch in the engaged position, and Fig. 7 shows it in the disengaged position. The part 58 is equipped at its opposite faces with suitable facing material, as in the first form. The operation of this form of clutch will be obvious from the foregoing description.

It will be evident that in both forms shown in the drawings, the clutch structure includes a clutch member rigid with the shaft which is to be driven, said clutch member being located within the rear part of a casing member by means of which the shaft is to be driven, there being mounted upon the casing member an axially movable clutch member having a part projecting into the casing member and adapted to be clamped against the first clutch member by an axially movable clutch member between which and the first clutch member the axially movable part projecting into the casing member is interposed. The last-mentioned clutch member is spring pressed so that normally the clutch is engaged, but a piston member rigid with said clutch member can be thrust forwardly by introducing fluid behind the piston member so as to effect disengagement of the clutch. The member projecting inwardly into the casing is one element of the clutch, the same being adapted to be clamped between two other elements that are splined together, one of these elements being fixed in an axial direction relatively to the shaft, and the other being axially movable and splined to the last-mentioned member and carrying at its radially inner part a member adapted to be thrust forwardly by the direct application of pressure fluid. The ledge by which the outer members of the clutch are splined together also serves in conjunction with a flange on the shaft to provide a pressure cylinder in which is disposed the annular piston rigidly connected to the axially movable outer (forward) clutch element.

By the described construction a friction clutch is provided which is simple, strong and gives satisfactory service. The invention provides a form of pressure-operated friction clutch which is especially well adapted for use in marine reversing gears.

While two forms of the device are illustrated in the drawings, it is understood that the invention can take many different forms, and that various modifications and changes in the details may be made without departing from the principles of the invention or the scope of the claims.

It is understood that in both of the forms selected for illustration the radial lugs of the intermediate clutch member are free to move in an axial direction within the recesses of the casing member A or AA, as much as is required for the engagement and disengagement of the clutch. In engaging the clutch, movement is limited by member D or DD, and in disengaging, by the member E or EE, the latter being under the control of the limiting ring or stop ring with which the guide pins are equipped. In both cases the face of the flywheel is recessed to an extent to give additional room for the clutch parts, as shown in the drawings, the result being that, considering the flywheel and the connected member as providing a casing, the intermediate clutch member is connected to such casing intermediate of the ends of the latter.

What we claim is:

1. In clutch mechanism, the combination of a generally cup-shaped casing member adapted to serve as a driving member provided with a transverse wall defining the bottom of the cup, the other end of said member being open, a shaft adapted to be driven having an end portion entering said member through said transverse wall, a member closing the opposite end of the casing member and positioning the end of said shaft, said casing member carrying interiorly intermediate of its ends a friction-clutch member projecting inwardly from the periphery of said casing member and angularly rigid with said casing member so as to rotate therewith but shiftable in an axial direction, a second friction-clutch member within said casing member adjacent said transverse wall rigid with said shaft, a third friction-clutch member within said casing member on the opposite side of said first friction-clutch member axially movable to press said first friction-clutch member into engagement with the second, said third friction-clutch member having rigid therewith at the radially inner part thereof an annular piston guided along the end portion of the shaft and operating in a fluid-pressure chamber of annular shape surrounding the end portion of the shaft and in communication with a fluid-supply passage in the shaft, said pressure chamber being formed partly by the shaft and partly by the second friction-clutch member, the second and third friction-clutch members being splined together radially outwardly of said fluid chamber, and springs normally holding the clutch members in the engaged position, said members being disengageable by movement of said piston under fluid pressure.

2. In clutch mechanism, the combination of a generally cup-shaped casing member adapted to serve as a driving member provided with a transverse wall defining the bottom of the cup, a shaft adapted to be driven having an end portion entering said member through said transverse wall, said casing member carrying interiorly intermediate of its ends a friction-clutch member projecting inwardly from the periphery of said casing member and angularly rigid with said casing member so as to rotate therewith but shiftable in an axial direction, a second friction-clutch member within said casing member adjacent said transverse wall rigid with said shaft, a third friction-clutch member within said casing member on the opposite side of said first friction clutch member axially movable to press said first friction-clutch member into engagement with the second, said second friction-clutch member having rigid rods connecting it slidably with the third friction-clutch member and surrounded by springs normally holding the clutch members in the engaged position, the second and third friction-clutch members being interlocked with each other by means of splined ledges, the splined ledge of the second friction-clutch member being radially inwardly disposed with respect to that of the third friction clutch member, and a fluid-pressure-operated piston member connected with the third friction-clutch member and located radially inwardly of said ledges in a fluid-pressure chamber and axially movable in said chamber.

3. In clutch mechanism, the combination of a generally cup-shaped casing member adapted to serve as a driving member provided with a transverse wall defining the bottom of the cup, a shaft adapted to be driven having an end portion entering said member through said transverse wall, a flange provided upon the shaft within the cup and adjacent said transverse wall, a friction-clutch member connected at its radially inner portion to said flange and having a peripheral portion with a friction surface directed away from the bottom of the cup, said friction-clutch member having a forwardly extending ledge radially inwardly of said friction surface, a second friction clutch member projecting inwardly from the peripheral part of the casing member and having friction surfaces at opposite faces thereof one of which is adapted to engage said first friction surface, said second friction-clutch member being angularly rigid with respect to said casing member but independently shiftable in an axial direction, a third friction-clutch member axially movable and having a friction surface opposing one of those of the second member and adapted to press said second member against said first member and in interlocked sliding relationship to said first member, a plurality of springs associated with said third member normally holding the friction surfaces of the three members in engaged position, fluid-pressure means including a piston fixed to the radially inner part of said third friction-clutch member by means of which said third member is moved to a disengaged position to release the clamping pressure on said second member, guide pins fixed at their rear ends to said first friction-clutch member and extending forwardly through holes in the third friction clutch member and having their forward ends disposed forwardly of a shoulder on said third member, and a stop ring held on the forward ends of said guide pins and co-acting with said shoulder to limit the releasing movement of the clutch members.

4. In clutch mechanism, the combination of a rotary cup-shaped casing member adapted to act as a driving member, a shaft having an end portion located within said casing member and passing through the bottom of the cup, a flange on said shaft within the casing member, a friction-clutch member mounted peripherally of said casing member and projecting radially inward into said member and having friction surfaces at opposite faces, said member being fixed angularly with respect to said casing member but capable of some axial movement, a second clutch member connected to said flange within the casing member and having a peripheral friction surface opposing one of the friction surfaces of said first clutch member, a third friction clutch member at the opposite side of said first member and having a peripheral friction surface to co-act with the other friction surface of said first member, guide pins fixed at their rear ends to said second member and extending forwardly through holes in said third member and having associated therewith at their forward ends a stop ring to engage and limit the releasing movement of said third member, springs encircling said pins and located within sockets of said third member and adapted to maintain the clutch members normally in the engaged position, and fluid-pressure means including a piston fixed to the radially inner part of said third member for releasing the clutch against the action of said springs.

5. In clutch mechanism, the combination of a rotary cup-shaped casing member adapted to act as a driving member, a shaft having an end portion located within said casing member and passing through the bottom of the cup, a flange on said shaft within the casing member, a friction-clutch member mounted peripherally of said casing member and projecting radially inward into said member and having friction surfaces at opposite faces, said member being fixed angularly with respect to said casing member but capable of some axial movement, a second clutch member connected to said flange within the casing member and having a peripheral friction surface opposing one of the friction surfaces of said first clutch member, a third friction clutch member at the opposite side of said first member and having a peripheral friction surface to co-act with the other friction surface of said first member, guide pins fixed at their rear ends to said second member and extending forwardly through holes in said third member and having associated therewith at their forward ends a stop ring to engage and limit the releasing movement of said third member, springs encircling said pins and located within sockets of said third member and adapted to maintain the clutch members normally in the engaged position, and fluid-pressure means including a piston fixed to the radially inner part of said third member for releasing the clutch against the action of said springs, said second clutch member having a forwardly extended ledge to the radially outer part of which said third member is splined, the radially inner part of said ledge defining an expansion chamber of said fluid-pressure means.

6. In clutch mechanism, the combination of a rotary casing member in the form of a cup having a transverse wall or bottom, a shaft located within said casing member, a clutch member mounted peripherally of said casing member intermediate of the ends of said member and projecting inwardly into the casing member, clutch members in said casing member at opposite sides respectively of said first clutch member and in non-rotative relationship to said shaft between which said first clutch member is adapted to be clamped, at least one of said last-named clutch members being an axially movable member disposed at that side of the first clutch member which is remote from the bottom of the cup, splining means interconnecting the radially inner parts of the second-mentioned clutch members and holding them against rotation, springs embracing guide pins which are fixed to one of the second-mentioned clutch members and pass through openings in the other such member, said springs acting to hold the clutch in the engaged position, and fluid-pressure disengaging means for the clutch including an annular piston and an annular fluid-pressure chamber located at the radially inner part of said axially movable clutch member, said piston being movable in a direction away from the cup bottom to effect clutch disengagement.

ARTHUR T. NABSTEDT.
JOHN O. BERNDTSON.

REFERENCES CITED

The following references are of record in the file of this patent:

UNITED STATES PATENTS

| Number | Name | Date |
|---|---|---|
| 848,380 | Lake | Mar. 26, 1907 |
| 1,138,099 | Fornaca | May 4, 1915 |
| 1,270,794 | Dawson et al. | July 2, 1918 |
| 1,842,039 | Matthews | Jan. 19, 1932 |
| 2,060,692 | Rockwell | Nov. 10, 1936 |
| 2,068,579 | Tatter | Jan. 19, 1937 |
| 2,167,705 | Batten | Aug. 1, 1939 |
| 2,345,410 | Mierley | Mar. 28, 1944 |
| 2,388,857 | Lindsley | Nov. 13, 1945 |

FOREIGN PATENTS

| Number | Country | Date |
|---|---|---|
| 379,724 | France | Nov. 16, 1907 |